INVENTOR
CHARLES B. VOGEL
BY Theodore E. Bieber
HIS ATTORNEY

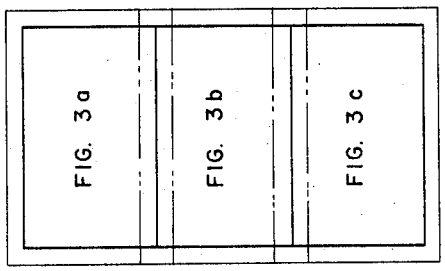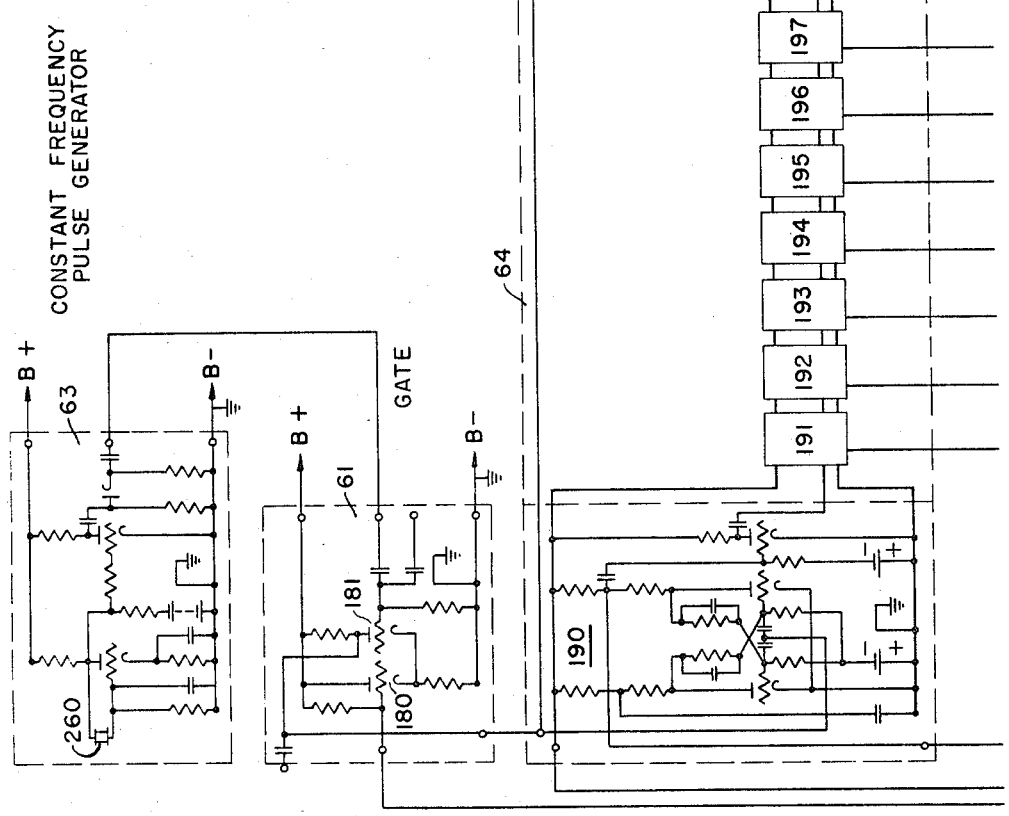

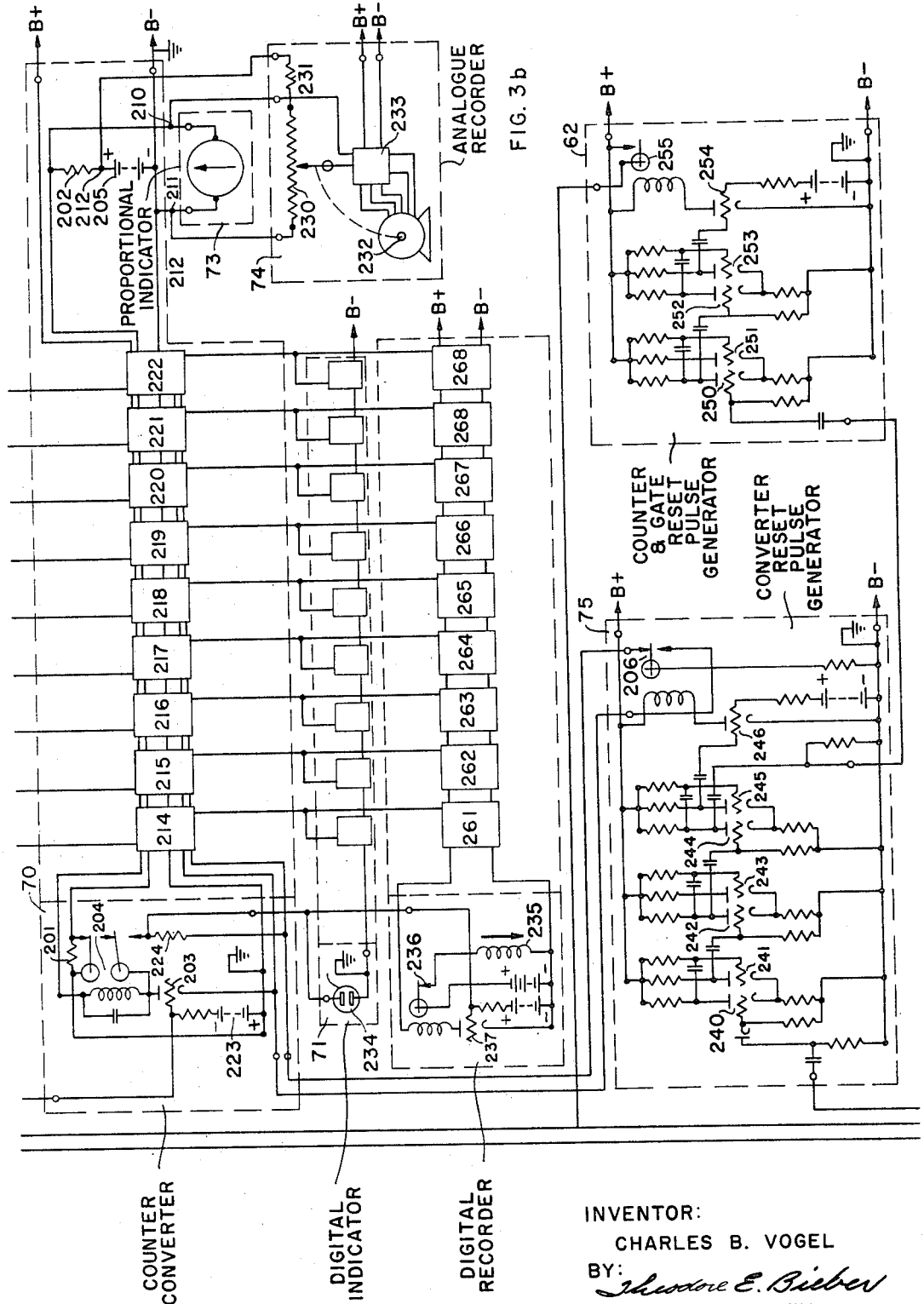

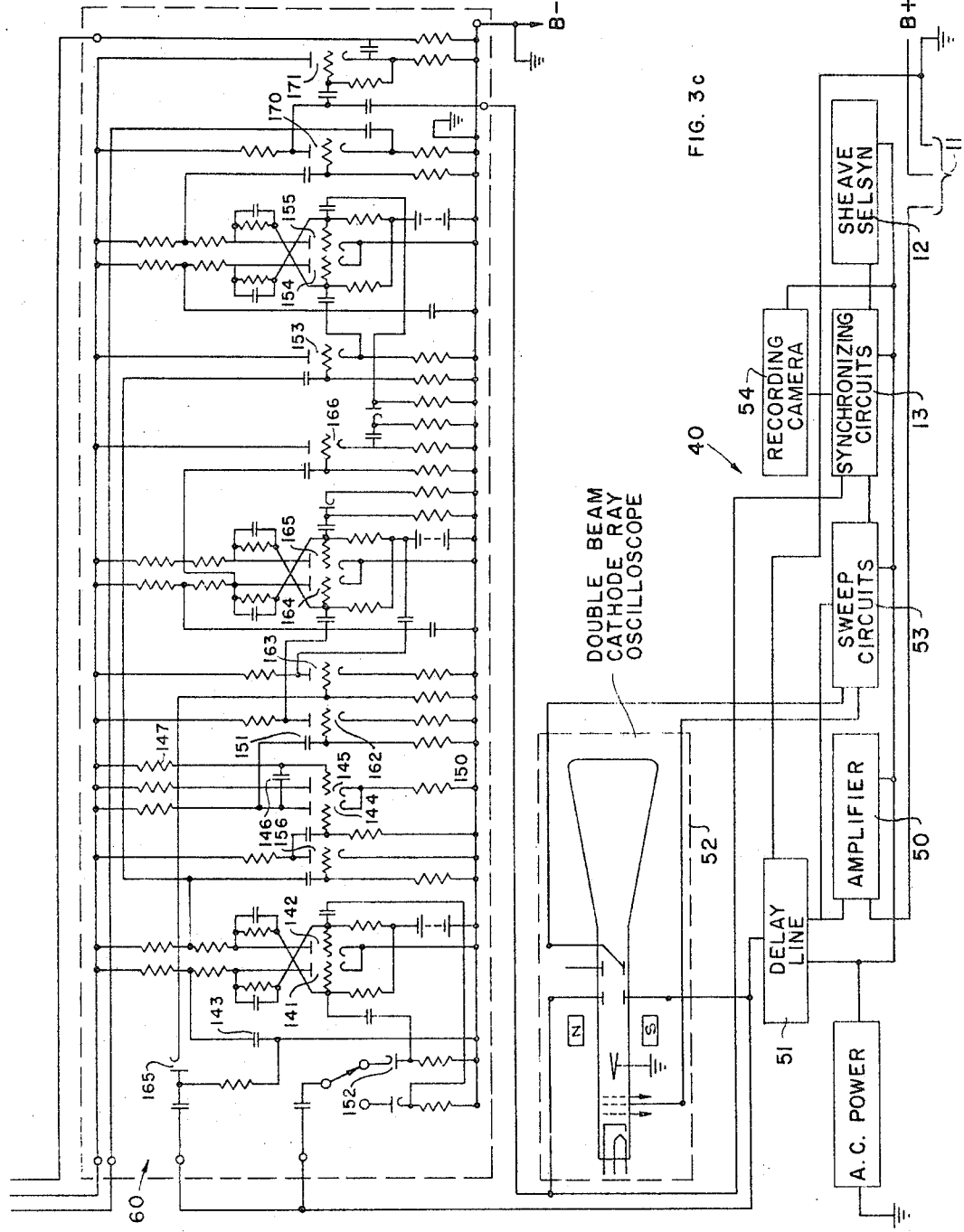

United States Patent Office

3,424,268
Patented Jan. 28, 1969

3,424,268
VELOCITY WELL LOGGING
Charles B. Vogel, Houston, Tex., assignor to Shell Oil Company, a corporation of Delaware
Filed Aug. 26, 1959, Ser. No. 836,303
U.S. Cl. 181—.5                    5 Claims
Int. Cl. G01v 1/28; G10k 11/00

This invention pertains to well logging and specifically to acoustical well logging. In acoustical well logging a device containing transmitters of sound waves and receivers of the same is lowered into a borehole. In this type of logging, at the surface there is placed an indicator or recorder to display information about the properties of earth materials penetrated by the borehole and detected by the device.

In the usual practice of the art, acoustical well logging is carried out by using one or two receivers and transmitting to the surface signals produced by these receivers when sound waves impinge thereon. In the usual type of acoustical well logging, the property of earth formations which it is of particular interest is the acoustical velocity of the formation. In the usual practice of the art, this property is measured by indicating and/or recording the time required for sound to travel either from a transmitter to a receiver located within the borehole or to travel from one receive to another receiver located within the borehole. Recording of this information has in the past been accomplished in several ways.

One method which has been used is described in my Patent No. 2,651,027. In this method the surface recording equipment includes a sweep generator which produced monotonically increasing waves of voltage, and these waves are applied to the plates of a cathode ray oscilloscope to produce motion of a beam of cathode rays across the face of the oscilloscope tube at a substantially constant speed. These monotonically increasing waves of voltage are produced in time correspondence with the occurrence of sound waves at one of the transducers in the borehole, and in the patent are described as occurring periodically beginning substantially with the production of sound at the transmitter. Signals from the receiver in the borehole are shown in the patent to be amplified and also applied to the cathode ray oscilloscope tubes, so that a measurement is made of the magnitude of the monotonically increasing wave of voltage existing at the time of reception of signal at the receivers. The image produced by the deflections of the cathode ray oscilloscope are then recorded to produce a permanent record, and this record then indicates the magnitude of the monotonically increasing wave of voltage which existed at the receiver at the instant of reception of sound, this instant occurring after a short delay each time the sound source fired, the delay in turn being inversely proportional to the velocity of the earth materials between the transmitter and receiver.

Another and similar method of recording this information is to record by means of a recording voltmeter the magnitude of the monotonically increasing wave of voltage at the instant of reception of sound at a receiver.

An analysis of the results obtainable using these two methods of recording indicates that the method whereby the oscilloscope face is photographically recorded is the more accurate, since there is provision for continual calibration of the rate of increase of the monotonically increasing sweep voltage by means of periodic application to the cathode ray oscilloscope tube of signals of a constant frequency. The application of such calibrating waves is described in Patent No 2,651,027, however, for many purposes it is convenient to have velocity information recorded in the form of a plotted curve. Unfortunately, logs recorded in this form in the past have had less accuracy than is desirable for some purposes. This lack of accuracy in general derives from the fact that the monotonically increasing voltages, the sensitivity of associated amplifiers, and the sensitivity of recording voltmeters in general vary or fluctuate to some extent with time. This fluctuation or drift of the electronic circuits is caused by aging of the components and general instability of some of the circuits.

It is accordingly a principal objective of this invention to provide an acurate method of recording logging information in the form of plotted curves in a way in which systematic errors are substantially reduced or eliminated by the use of digital signal processing.

It is the further objective of this invention to provide such a method of logging in which such plotted curves are recorded in combination with photographically recorded oscillograph traces in such a way as to provide a continuous calibration check of the accuracy of the plotted curves.

A further objective of this invention is the provision of records of log information made in a digital manner to allow later convenient manipulation of the data by means of electronic and especially digital electronic computers.

A further objective of this invention is the provision of simultaneous digital and proportional recordings of log information and simultaneous photo-oscillgraphic recording.

A further objective of this invention is the provision of downhole instrumentation using digital signal processing and of such form as to produce plotted curves displaying logging information with a minimum of distortion of these curves from electrical and acoustical disturbances within the borehole. This reduction of the effect of noise is brought about by transmitting to the surface not only initial portions of the original logging signals produced by receivers in the borehole, but also large amplitude relatively short-duration electrical transients produced in time relationship to the occurrence of these initial receiver signals within the borehole.

The above and other advantages of this invention are obtained by using logging signals produced by subsurface receivers to control gating circuits into which are fed pulses from a fixed frequency generator and from which are transmitted fixed frequency pulses to a digital counter at intervals not necessarily periodic. The digital counter in turn is connected to a recording circuit responsive to the condition of the counter, to indicate and record the values of the time intervals required for sound to travel from one receiver to another or from a transmitter to a receiver as the subsurface instruments are moved vertically within the borehole so as to successively be adjacent various earth formations penetrated by the borehole.

While there are several possible ways to obtain satisfactory logs in a well logging operation utilizing the method of this invention, a preferred way uses the digital logging method in combination with photooscillographic recording; and this is done in a unique manner in which the values indicated on the plotted curve are indicated also on the photooscillographic recording in combination with short-duration electrical transients in such a way as to provide continuous calibration of the curve plotter for the maximum possible accuracy.

The above and other objects of this invention will be more easily understood by those skilled in the art from the following descriptions, when taken with reference to the attached drawings in which:

FIGURES 3a, 3b and 3c are schematic diagrams illustrating in a more detailed manner a surface-located portion of the preferred embodiment of FIGURE 1 of the apparatus for practice of the present invention;

FIGURE 8 illustrates the assembly of FIGURES 3a, 3b and 3c to form one drawing.

Figure 1:
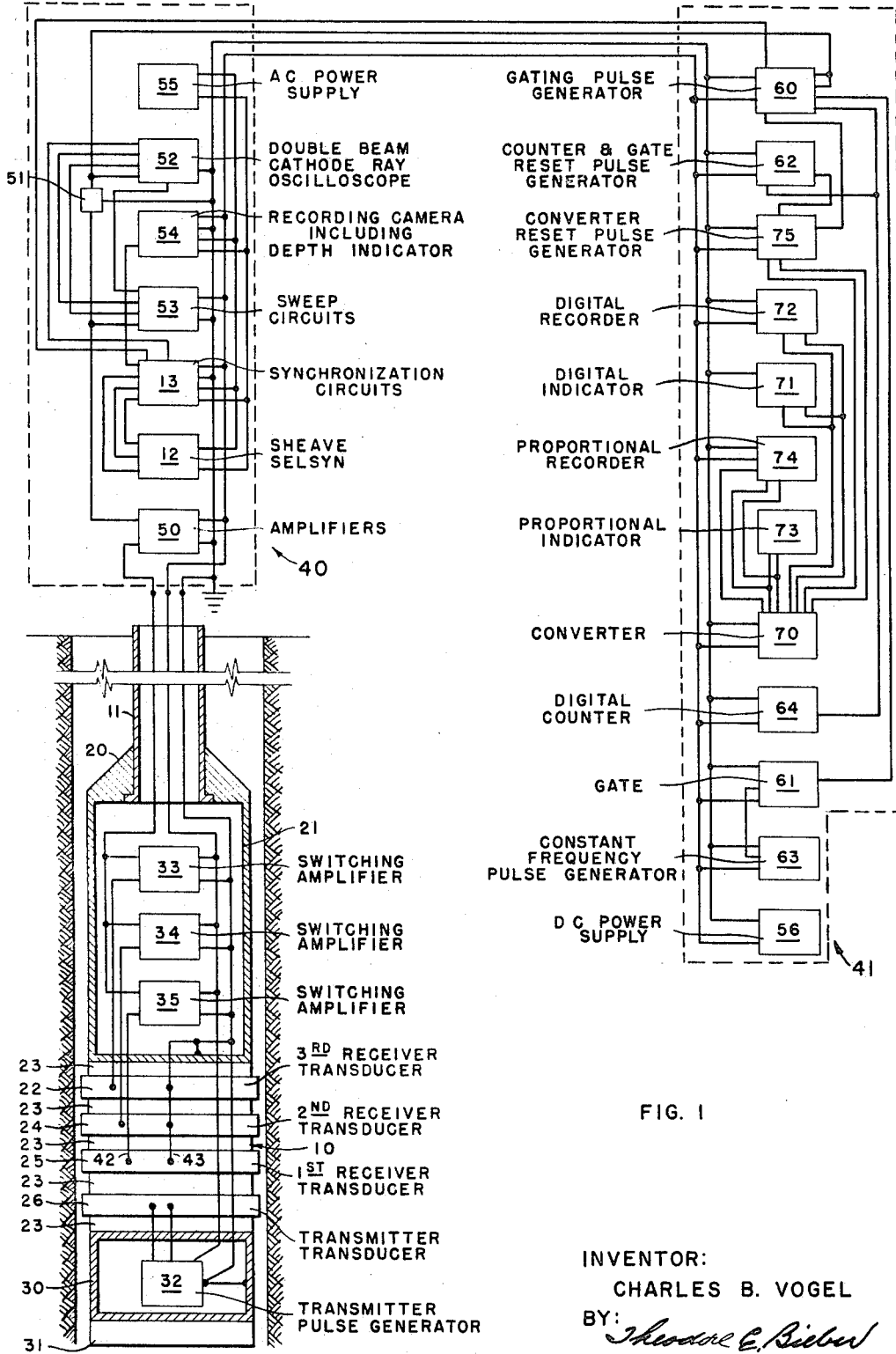
FIGURE 1 illustrates in a generalized manner the construction and operation of a preferred embodiment of apparatus for practicing this invention shown partly in section within the earth and in block diagram form at the surface.

Referring to FIGURE 1, there is illustrated an apparatus similar in some respects to that described in Patent No. 2,708,485 and in my pending applications Serial No. 705,352, filed December 20, 1957, now Patent No 3,063,035 and Serial No. 745,073, filed June 27, 1958, now Patent 2,986,694. The apparatus comprises a measuring unit or probe consisting of an elongated tubular housing 10, adapted to be lowered into a borehole at the end of a cable 11 which is preferably a coaxial or multiconductor-insulated cable. The cable 11 passes over a suitably powered and calibrated sheave selsyn 12 which may be coupled or associated with a selsyn generator not shown. The cable is electrically connected to surface recording and/or indicating elements. These will be discussed in greater detail below. The sheave selsyn 12 is electrically connected to unit 13, which consists of synchronization circuits. These circuits initiate operation of the sweep circuits, the recorder camera, depth indicator circuits, the recorder camera film transport circuits, and the cathode ray oscilloscope beam exciting circuits in such a way that the depth or level of the measuring unit may be measured or recorded at any instant together with the measurement signals from the probe 10, which is located within the borehole. The synchronization circuits are of conventional nature and of a type well known to those skilled in the art and therefore will not be discussed in detail here. The probe 10 consists of a plurality of tubular members preferably held in fluid-tight, screw-threaded engagement with each other. These members may comprise an upper head connector 20, through which mechanical and electrical connections are effected between the probe 10 and the cable 11, an upper instrument case 21, an elastic link member 23, an upper receiver 22, a middle receiver 24, a lower receiver 25, a transmitter transducer 26, a lower instrument case 30, and a bottom closure head 31, which may comprise a lead sinker weighing, for example, 50 pounds. The elastic link member 23 is a continuous member connected to the upper and lower instrument cases with the transmitter and receiver mounted on its outer surface. The purpose of the instrument cases 21 and 30 is to accommodate in a pressure-tight manner the auxiliary electric and electronic equipment necessary for the operation of the transmitter and the receivers, such as the pulse generating circuit 32, and switching amplifiers 33, 34 and 35, respectively. The primary purpose of the flexible link members 23 is to serve as electrical and mechanical connectors between the transmitter and the receivers and instrument cases 21 and 30. The axial length of the pressure-tight cases 21 and 30 may vary from two to four feet as necessary to house the auxiliary equipment. The axial length of the elastic link members are set by the distances selected for the intervals over which velocities are to be measured between the receivers 22, 24 and 25. In the preferred arrangement the receivers are spaced along the elastic link member 23 so that the distance from the lower receiver 25 to the middle receiver 24 is four feet and the distance between the middle receiver 24 and the upper receiver 22 is one foot; and the transmitter 26 is spaced four feet below the lower receiver. The transmitter and receiver transducers may each have an appreciable axial length so that the length of the link members should be adjusted to provide the desired spacing between the effective centers of the transmitters and receivers. The purpose of inserting the flexible link member 23 into the downhole probe 10 is primarily to give the apparatus sufficient flexibility for operation in crooked boreholes by means of a link member that is adapted to both maintain a fixed spacing between the transducers and reduce the transmission of acoustic energy to the body of the probe 10.

In general, the apparatus employed in the practice of the present invention can be composed of presently known elements, such as the well logging cable, the housing, the flexible but substantially inextensible link member described in Patent 2,708,485 and patent application Serial Number 745,351 filed June 20, 1958, now Patent 3,062,-314. The surface-recording equipment illustrated in FIGURE 1 consists of a photo-oscillographic recorder 40 and an automatic curve plotter recorder 41.

The lowermost portion of the subsurface probe 10 is a pressure-tight case 30 containing transmitter pulse generator circuits 32. The pulse generator 32 is constructed to produce periodically, for example, every one-third second, a pulse of sound or elastic vibrations by means of the transmitter transducer 26. This transducer, and the transducers 22, 24 and 25 used for receiving sound pulses, consists of a cylindrical magnetostrictive core on which there is a toroidal winding of insulated conductor wire. For example, the magnetostrictive core may consist of a nickel cylinder withoutside diameter 3½ inches, axial length 2 inches, wall thickness 1/16 inch. The toroidal winding may consist of No. 18 rubber-or Neoprene-insulated copper stranded wire, and may have, for example, 80 turns. The transmitter pulse generator circuit 32 is coupled to the transmitter transducer 26 thus transmitting a pulse of current to transducer 26 causing a change in the magnetic state of the core of magnetostrictive material and a corresponding change in its radial dimensions, so that there results an outgoing pulse of sound, which may have a frequency of 15,000 c.p.s. and a duration of, for example, 100 microseconds. This outgoing sound pulse then travels outwardly through the borehole fluid and then up through the earth materials through which the borehole is drilled, and impinges in succession upon receiver transducers 25, 24 and 22 as it travels toward the surface of the earth.

When the sound pulse impinges upon receiver transducer 25, it produces voltage fluctuations which are transmitted through leads 42 and 43 to switching amplifier 35. As will be seen in the drawing, one side of this transducer is connected by lead 43 to a ground terminal tied to the upper pressure tight case 21. This is true for each of the transducers, except the one used in the transmitter, so that the signal voltages are developed between ground and the respective terminals of the associated amplifiers. Thus, the voltage fluctuations produced at receiver transducer 25 have a character illustrated FIGURE 7a, consisting of a first half cycle (shaded), followed by later cycles. The fact that many cycles of voltage are produced at the receivers even though the transmitter produces substantially only a few cycles (typically 1½) is attributable to the elastic ringing of the borehole, which in this respect acts somewhat in the same manner as does a struck bell. The amplifier 35 is similar to that described in by Patent No. 3,062,314, except that it has been modified as regards its circuits in two particulars. This circuit will be discussed later with reference to FIGURE 4. Switching amplifier 35 modifies the receiver transducer signal to a form illustrated by FIGURE 7b. It is seen that the first half cycle (shaded) is amplified without distortion, but that the remainder of the signal from the transducer is switched off. Also, there is added to the output of amplifier 35 a pulse or spike.

During the practice of any velocity logging operation it is possible for the receiver transducers to produce signals not only in response to the arrival of sound pulses produced by operation of the transmitter pulse generator, but also in response to the occurrence of noise in the borehole. This noise may be acoustic, caused by the rubbing of the instruments against the borehole wall, horizontal motion and bumping of the instruments within the borehole wall. Such noise is generally small compared to the amplitude of the sound pulses of interest; also it generally has a lower frequency than that of the sound pulses of interest. However, it is a common characteristic of well logging cables that they discriminate against high frequency electrical signals and favor those of lower frequency. Thus, it is possible in acoustic logging methods producing automatically plotted logs, as in the invention here described, for undesired noise signals to trigger the surface-recording instruments and produce erroneous indications. By means of the spike pulses, the probability of such erroneous indications is greatly reduced, since the spike has a very large initial amplitude and thus has an amplitude larger than that of noise signals, even at the surface, despite the fact that well logging cables attenuate these short-duration spike pulses more than they attenuate low-frequency noise signals. Since the spike pulses are produced immediately following the first half cycle of received energy, they occur in time correspondence with the reception of the first half cycle of received energy and can be used to operate the surface curve plotter apparatus with a much smaller probability of erroneous indications produced in response to noise.

In a manner similar to that described for receiver transducer 25 and amplifier 35, signals are transduced and modified to produce output signals at amplifiers 33 and 34, except that the amplifiers 33 and 34 are so constructed that the output signals they produce are of opposite polarity from corresponding signals produced by amplifier 35. Thus, at the surface, there is produced for each operating cycle of the transmitter pulse generator 32 fluctuating signal voltages of the form illustrated by curve shown in FIGURE 7c. The portions of this fluctuating signal voltage are the following: 44 represents the first half cycle of energy received by receiver transducer 25; 45 represents the spike pulse produced by amplifier 35; 46 represents the first half cycle of energy received by receiver transducer 24; 47 represents the spike pulse produced by the amplifier 34; 48 represents the first half cycle of received energy received by receiver transducer 22; and 49 represents the spike pulse produced by amplifier 33.

The following traces the sequence of production of electric signals in the surface-located photo-oscillographic recorder 40. The signals represented by curve of FIGURE 7c, are transmitted to the surface by means of cable 11 from the subsurface probe 10. At the surface they are coupled to amplifier 50 which is of conventional design and thus details of its construction will not be discussed. It is so constructed as to provide voltage amplification in the ratio of about 100:1. The amplified signals appear on output side and have the same general form as the input signal, except that they have larger amplitudes. The output signals from amplifier 50 are transmitted through a signal delaying device 51 which may be a delay line to a double beam cathode ray oscilloscope 52, where they produce vertical deflections of the cathode ray beam proportional to signal amplitude at any given instant. The output signals are also transmitted to a sweep circuit 53, where they cause triggering of the horizontal sweep circuits of 52. The sweep circuits 53 are of conventional design, and their details will not be discussed. The sweep circuit 53 is constructed that on the occurrence of signal 45 of FIGURE 7c they suddenly begin the production of a monotonically increasing wave of voltage at its output terminals. The monotonically increasing voltage is coupled to the horizontal deflection plates of the cathode ray beam of the double-beam cathode ray oscilloscope 57. In this way there is obtained an indication of the magnitude of the monotonically increasing wave of voltage existing at the instant of the production of each of the receiver signals; and also this information is stored and recorded by means of a photographic recorder or camera, namely, the recorder camera 54 including a depth indicator. The monotonically increasing wave of voltage produced by sweep circuits 53 is commonly known as a sweep voltage wave to those skilled in the art, and its use for measuring time intervals in an acoustic logging instrument is well known to those skilled in the art, and is described in Patent 2,651,027. Sweep circuits 53 also produce a beam brightening pulse of voltage to turn on the normally extinguished cathode ray beam of cathode ray oscilloscope 52 for a period of time equal to the coincident with that of the sweep voltage wave, which is the monotonically increasing wave of voltage referred to above.

Synchronization circuits 13 contain switching circuits, pulse generating circuits, control circuits, and timing wave calibration circuits to control all the components of the photo-oscillographic recorder in a way to cause them to operate in proper sequence. The details of the construction of the synchronization circuits are of conventional nature well known to those skilled in the art and will not be described except in a general way here with respect to their mode of operation. The synchronization circuits 13 are connected electrically to a sheave selsyn 12 by means of conductors. The output of the selsyn 12 is connected within the synchronization circuits 13 to a receiving selsyn which operates switches mechanically to effect the control functions above referred to. Thus, the synchronization circuits 13 operate to couple a square wave signal from the gating pulse generator 60 of the curve plotter 41 to the synchronization circuits 13 and to periodically disconnect the square wave signals therefrom and connect instead a timing wave calibration signal produced by a timing wave calibration signal generator contained within the synchronization circuits 13. These timing wave calibration signals are the signals produced by a generator of constant frequency pulses at a frequency of, for example, ten kilocycles to provide continual high accuracy calibration of the entire velocity logger system by means of photo-oscillographic record. The synchronization circuits 13 are also coupled to the recorder camera 54; and by means of electrical signals so transmitted the synchronization circuits 13 control the transport of film in the camera after the recording of each measurement on the face of the cathode ray oscilloscope 52, and also control the lighting of a lamp to illuminate numbers of a mechanical counter so connected mechanically as to at each instant indicate the depth of the subsurface probe 10. This mechanical counter is contained in the recorder camera and is mechanically coupled to the receiver selsyn contained in the synchronization circuits 13.

The sheave selsyn 12 is mechanically connected or coupled to a sheave by any desired means not shown over which passes the well logging cable 11 as the subsurface probe 10 is lowered into the borehole. Thus, the sheave selsyn 12 generates voltages transmitted to synchronizing circuits 13 which cause mechanical rotation of the receiver selsyn contained in the synchronization circuits and corresponding rotation of the mechanical counter in the recorder camera to continually indicate the depth of the subsurface instruments during the recording process. All the components of the oscillographic recorder are connected to suitable alternating current 55 and direct current power source 56 respectively to insure their correct operation in the manner above described.

The following traces the sequence of production of electrical signals in the surface-located digital logging circuits which form a portion of curve plotter 41. The receiver signals from amplifier 50 now amplified, are transmitted to a gating pulse generator 60. The details of construction of the circuits of the gating pulse generator 60 will be discussed in detail below. The construction of gating pulse generator 60 is such that an occurrence of spike pulse 45 produced in response to reception of sound at receiver 25, the circuits of gating pulse generator 60 begin to produce a positive gating pulse signal of form illustrated by curve shown in FIGURE 7d and a negative gating pulse signal of the same form, except for polarity. The negative gating pulse is transmitted to the double-beam cathode ray oscilloscope 52 in the manner described above; and the positive pulse is transmitted to a gate circuit 61. The negative gating pulse signal is also transmitted to a counter reset pulse generator 62.

With respect to operation of the gate circuits 61, into these circuits are supplied with a continuous train of constant frequency pulses with a frequency of, for example, 1 megacycle. The frequency of these pulses is conveniently controlled by a quartz crystal, and is thus maintained easily at a constant value. These constant frequency pulses are produced by constant frequency pulse generator 63 and are transmitted to gate circuits 61. In the normal condition existing prior to reception of receiver signals and corresponding spike pulse signals, the output of the gate circuits is zero. However, on the occurrence of a gating pulse signal transmitted thereto from the gating pulse generator 60 in response to reception of a sound pulse at receiver 25 the gate circuits 61 begin to produce a train of constant frequency pulses from the constant frequency pulse generator 63. This train of pulses is transmitted from the gate circuits 61 to the digital counter circuits 64.

When spike pulse signal 47 is produced in response to arrival of a sound pulse at the middle receiver transducer 24, the generation of the gating pulse signals in gating pulse generator circuits 60 is terminated. As a result, there is also terminated the train of constant frequency pulses of the gate circuit 61.

With respect to operation of the digital counter circuits 64, these circuits are composed of a series of pairs of vacuum tubes with each pair coupled to form a monostable trigger circuit. The monostable trigger circuit operates in such a way that only one vacuum tube of each pair may conduct at any given instant. They are further so wired that in their initial condition, prior to the reception of sound pulses, a given specific set of corresponding vacuum tubes are conducting. Thus, each time these circuits are reset into their initial condition after a measurement cycle, the same vacuum tubes are conducting as were conducting prior to the reception of any receiver signals at the beginning of a logging operation. The digital counter circuits are further wired so that each time a pulse is fed into the digital counter 64 certain conducting vacuum tubes cease to conduct and certain other non-conducting vacuum tubes begin to conduct. Further, the combination of conducting and nonconducting vacuum tubes is changed at the reception of each pulse, so that any given combination of conducting and nonconducting vacuum tubes corresponds to a certain number of constant frequency pulses which have been fed into the counter during the duration of gating pulse from generator 60. The particular embodiment of counter circuits used in practicing this invention is here described in terms of a scale of two counter. However, counters with other bases can be used without departing from the substance of the invention. Details of the construction of digital counter 64 will be discussed in connection with FIGURE 3. From the foregoing it is clear that after the reception of spike pulse signal 47 produced in response to reception of a sound pulse at middle receiver 24, the condition of digital counter 64 has been changed in such a way that there is a unique pattern or combination of conductive and nonconducting vacuum tubes, and in such a way that this particular pattern corresponds to the time interval required for a sound pulse to travel in the borehole from the nearest receiver 25 to the middle receiver 24.

As stated above, the circuits of digital counter 64 are in part iterative; that is to say, they are composed in part of identical circuits repeated a number of times. This iterative situation exists also for the converter circuits 70, for the digital indicator circuits 71, and for the digital recorder circuits 72. In the digital counter circuits 64 the iterative portions of the circuits consists of the pairs of vacuum tubes comprising the monostable trigger circuits above referred to and their associated buffer or coupling vacuum tube amplifier stages. This will be explained more fully in connection with FIGURE 3. In digital counter 64 the number of monostable trigger circuits must be large enough to allow measurement of the longest time interval likely to be encountered in practice of the invention. If the spacing between the nearest receiver 25 and the middle receiver 24 is set at 5 feet, then the longest time interval likely to occur between reception of sound pulses successively at these two receivers will be approximately 1000 microseconds. If the frequency of the constant frequency pulse generator 63 is set at 1 megacycle, then the number of monostable trigger circuits in digital counter 64 should be set at 10. This allows the digital counter 64 to count time intervals as long as $2^{10}$ or 1024 microseconds and as short as 1 microsecond with an uncertainty or possible error of 1 microsecond.

For each monostable trigger circuit of digital counter 64, there is provided a terminal to transmit signals to converter 70 where these signals cause the converter 70 to change its condition in such a way as to produce signals for operation of the proportional indicator 73, the proportional recorder 74, the digital indicator 71, and the digital recorder 72.

With respect to operation of the converter circuits 70, these circuits are in part iterative as stated above, and in these circuits there are similar corresponding elementary circuits connected to each corresponding bistable trigger circuit of digital counter 64. Converter 70 is so constructed as to produce a voltage which is proportional to the number of constant frequency pulses counted by digital counter 64, this number in turn being proportional to the time interval required for a sound pulse to travel in the borehole from the nearest receiver 25 to the middle receiver 24. This is accomplished by means of relays which control the connections between resistors contained within the converter 70. Details of the construction of converter 70 will be explained in greater detail in connection with discussion of FIGURE 3. Converter 70 is further constructed as to produce electrical signals which are transmitted into digital indicator 71 and into digital recorder 72.

With respect to digital indicator 71, this unit contains a plurality of electric lamps or similar visual electrically operated devices and constructed so that electrical signals transmitted to it cause certain of these lamps to be lighted to indicate the condition with respect to vacuum tube conductivity of the individual corresponding monostable triggers contained in digital counter 64. Thus, for a given time interval represented by the combination of conductive vacuum tubes in the digital counter 64, there will be a corresponding pattern of lamps lighted in digital indicator 71.

With respect to digital recorder 72, this device contains a paper tape, a tape feed mechanism operated in depth synchronism with the sheave selsyn 12, and solenoid-operated tape punching devices for punching a pattern of holes in the contained paper tape. Electrical signals are transmitted to the digital recorder 72 from the converter 70 to cause operation of the solenoid-operated paper punches, so that for a given pattern of conductive vacuum tubes in digital counter 64 there is produced a corresponding pattern of punched holes to represent in a digital way the time interval required for a sound pulse to travel between the nearest and the middle receivers in the subsurface apparatus.

With respect to proportional indicator 73, this device may conveniently be a moving coil type voltmeter with a pointer moving opposite a scale calibrated in volts or in microseconds of travel time. Electrical signals are transmitted to the proportional indicator 73 from the converter 70 and these signals cause a proportional deflection of the indicating pointer to indicate in a proportional manner the time required for a sound pulse to travel from the nearest to the middle receiver in subsurface probe 10.

With respect to the proportional recorder 74, this device may conveniently contain a slide wire pen recorder with associated pen drive motor, paper drive mechanism connected with sheave selsyn 12 to move a paper chart in depth synchronism with sheave selsyn 12, and associated resistor element with a sliding connector, and associated amplifiers. Electrical signals are transmitted to the proportional recorder 74 from the converter 70. The proportional recorder 74 is so constructed that electrical signals transmitted into it cause the pen drive motor to move a sliding connector along a resistor element and a pen mechanically coupled with said sliding connector to such a point that the pen records on the chart paper a deflection proportional to the time interval required for a sound pulse to travel from the nearest to the middle receiver in the subsurface apparatus. Since the paper drive mechanism is operated in depth synchronism with the motion of the subsurface probe 10 by means of connection with sheave selsyn 12, there results a constant known scale of depth on the recording chart paper.

With reference to converter reset pulse generator 75, this subcircuit produces pulses which cause the indications and deflections of the digital recorder, the digital indicator, the proportional indicator, and the proportional recorder to change from those resulting from a previous measurement cycle to those corresponding to a new measurement cycle as successive measurement cycles occur in response to successive sound pulses produced by the transmitter transducer in the borehole. The converter reset pulse generator 75 thus resets the indicator and recorder circuits by energizing a relay in converter reset pulse generator 75, this relay being in turn connected to converter subcircuits 70. When said relay is energized, it causes converter subcircuits 70 to assume a new condition corresponding to the travel time in the earth between the pertinent receivers at the instan a new measurement cycle is begun as the subsurface instruments are movd in the borehole and as the transmitter transducer produces successive sound pulses.

With respect to the counter and gate reset pulse generator subcircuits 62, near the end of a measurement cycle these subcircuits act to reset the digital counter and the gate pulse generator into their initial conditions which obtained prior to the beginning of the first measurement cycle, so that the surface recording instruments will be ready for the beginning of another measurement cycle. This resetting action is produced by a relay which is energized for a short period of time in counter and gate reset pulse generator subcircuits 62. When this relay is energized it acts to remove plate power for a short period of time from the digital counter subcircuits and from the gating pulse generator subcircuits, thus returning these subcircuits to their initial conditions.

FIGURE 7e represents the form of voltage supplied to the proportional indicator 73 and proportional recorder 74 when the downhole hole probe measures the time required for the sound impulse to travel through two successive earth formations having different velocities. The two reset circuits 62 and 72 generate short duration square wave voltage pulses shown in FIGURE 7f and 7g respectively, to reset the various circuits.

It will be clear that the digital logging circuits 41 here described can be used without the photo-oscillographic recorder 40 to produce all the above-described types of record merely by omitting the photo-oscillographic recorder subcircuits and by providing in their place the amplifiers and delay devices required to produce the digital types of record.

Figure 2A:
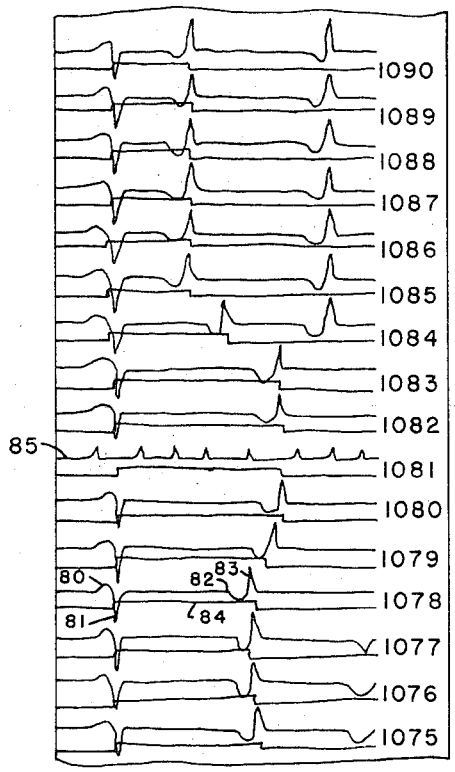
FIGURES 2a and 2b are diagrammatic representations of the records obtained in the practice of this invention.

With reference to FIGURE 2, there is illustrated two types of records produced in practice of this invention. FIGURE 2a illustrates diagrammatically a photo-oscillographic record. This record is conveniently recorded on photographically sensitive paper or film by means of the recorder camera 54, which photographs the face of cathode ray oscilloscope 52 on which are displayed signals produced by subsurface probe 10 and signals produced by gating pulse generator 60 of FIGURE 1. For each measurement recorded on the photo-oscillographic record there are two traces on the record. One trace displays the form of the first half cycle of received signal produced at the nearest receiver 25, illustrated at 80, and the spike pulse signal produced by switching amplifier 35, illustrated at 81. Also on this trace is displayed the form of the first half cycle of received signal produced at the middle receiver 24, illustrated at 82, and the form of the spike pulse signal produced by switching amplifier 34, indicated at 83. The received signals do not occur on the extreme lefthand edge of the record, but occur after a straight portion of the trace, the length of which is proportional to the delay of delay line 51.

Figure 2B:
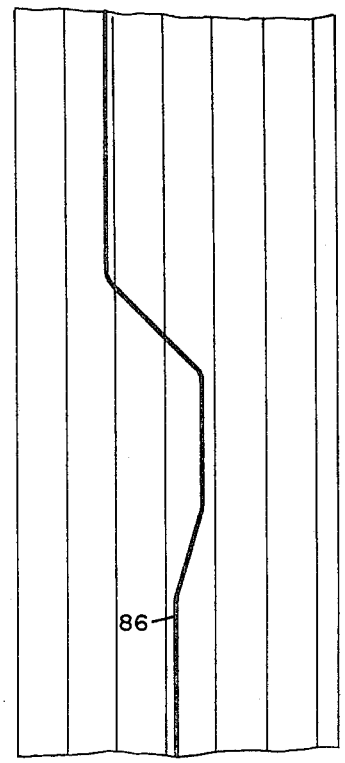

Another trace displays the form of the gating pulse signal produced by gating pulse generator 60, illustrated at 84. Special traces display the form of signals produced by the constant frequency timing wave calibration generator contained in synchronization circuits 13, illustrated at 85. Along side each pair of recorded oscilloscope traces there is recorded the number indicated by the mechanical counter contained in the recorder camera 54 to record the depth of the subsurface apparatus at the instant of recording the corresponding pair of traces. FIGURE 2b illustrates the record made by proportional recorder 74, this may conveniently be traced on paper by an inked pen contained in proportional recorder 74. On this record is an inked traced line 86 for which the horizontal deflection from the lefthand edge of the record is conveniently made proportional to the time required for a sound pulse to travel from the nearest to the middle receiver of the subsurface probe. On the record are provided vertical scale lines which may conveniently represent a time interval of 50 microseconds. By comparing the indications of the two records of FIGURES 2a and 2b, it is possible to ascertain the validity of deflections shown on record of FIGURE 2b. Record FIGURE 2b is much the more convenient record to use in practice, but does not contain in itself any calibration indications. Such calibration is provided by photo-oscillographic record of FIGURE 2a. One method of checking the accuracy of record of FIGURE 2b is to examine the square wave or gating pulse signal recorded on the lowermost traces of each pair of traces on record of FIGURE 2a. This gating pulse signal has a duration equal to that time interval during which the digital counter 64 was counting constant frequency pulses for the measurement in question. Where this square wave occurs at such a place on the trace that a vertical projection of its lefthand edge and a vertical projection of its righthand edge intersect corresponding portions of the two respective receiver signals, then the deflection on record of FIGURE 2a indicates accurately the time interval required for a sound pulse to travel from the nearest to the middle receiver in the subsurface apparatus. Another method of obtaining the desired calibration of record of FIGURE 2a is to use timing trace 85 as a scale and to measure thereon the distance between corresponding portions of receiver signal deflection indications 80 and 82 respectively. Thus, a correct measure of the travel time between receivers is obtained, since the frequency of the timing calibration wave generator is known with great accuracy. This correct measurement then is compared with the indication of the trace on record of FIGURE 2b and any necessary correction of the vertical calibration scale lines can then be made.

Of course, with the digital recording method used in this invention, the indications of proportional recorder 74 will be highly accurate in displaying the travel time between receivers and will not be affected by any substantial errors caused by drift or variation of supply voltages or by variations of characteristics of vacuum tubes used in the apparatus. However, there may still remain in the record slight residual errors caused by the human operator of the apparatus making incorrect adjustments of the apparatus prior to beginning a logging operation, and the above-described procedures for correcting the indications of log of FIGURE 2b by reference to log of FIGURE 2a is for the purpose of making corrections for these same small residual errors.

Figure 5:
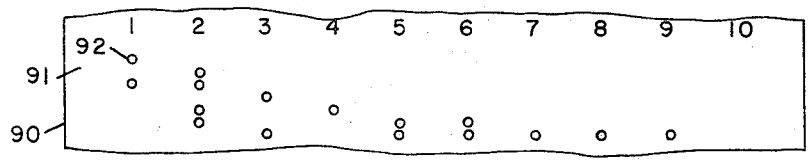
FIGURE 5 illustrates one form of the digital record produced by the digital recorder used in practice of this invention.

With reference to FIGURE 5, there is here illustrated the form of the digital record produced by digital recorder 72 having 10 vertical rows of hole punch positions. The record paper 90 is moved in depth synchronization with travel of the subsurface instruments within the borehole, so that on record 90 there is a known constant vertical depth scale. Thus, there are punched along any given line across the width of the record paper a combination of holes which indicates the travel time between receivers in the subsurface apparatus at a depth corresponding with the depth represented by a horizontal depth scale line passing through said combination of holes. Thus, along the depth scale line 91 there is punched a combination of holes, such as the hole at 92, which indicates a travel time of 1 microsecond. In like manner on the succeeding 9 horizontal rows of holes below line 91 there are indicated travel times of 2, 3, 4, 10, 200 and 1000 respectively, shown here for illustrative purposes.

It is clear that digital codes other than that shown can be used in practice of the present invention. In FIGURE 5 each vertical row of holes (along the length of the chart) corresponds to a given specific monostable trigger circuit in the digital counter 64. Digital records such as that illustrated in FIGURE 5 are especially useful for later processing of the well logging data obtained in a logging operation. Thus, the punched paper record may conveniently be fed into appropriate decoding apparatus to provide signals for later operation of a digital or analogue computer to effect useful manipulation of the well logging data, with a corresponding saving in time required for such manipulation. In such subsequent manipulation of data in a digital or analogue computer the numbers resulting from such manipulation may conveniently be recorded by a digital recorder or by an analogue recorder for convenient presentation of the manipulated form of the well logging data.

Figure 4:
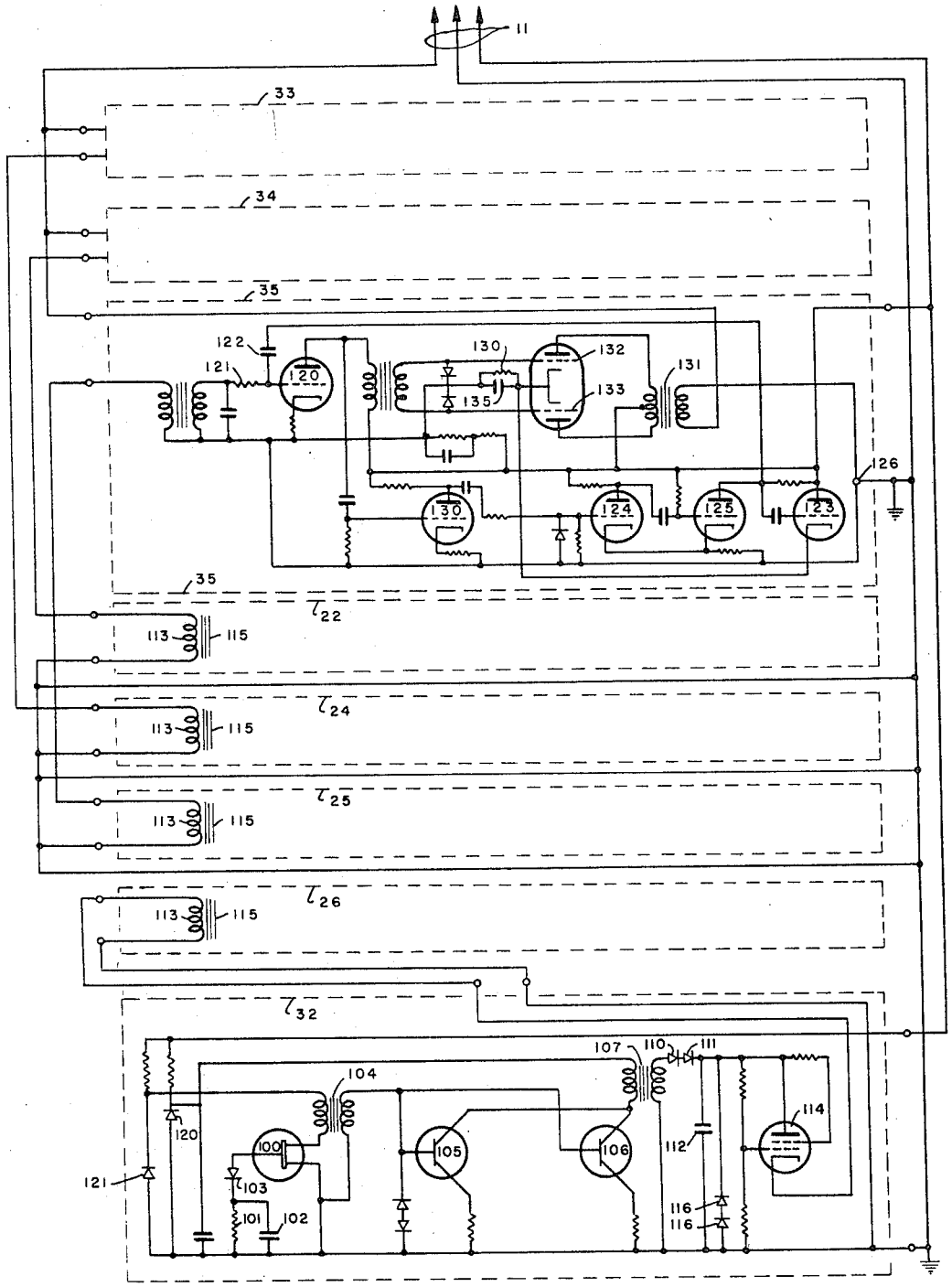
FIGURE 4 is a schematic diagram of the subsurface-located portion of the preferred embodiment of FIGURE 1 of the apparatus for practice of the present invention.

Reference is made to FIGURE 4 showing the transmitter pulse generator circuits 32 having a double-base diode 100 connected to a resistor 101, condenser 102 and diode 103, so that this portion of the circuit produces in the primary winding of transformer 104 pulsations or oscillations of electric current. These pulsations produce voltage pulsations across the secondary winding of a transformer, which voltage fluctuations are fed into the base connections of transistors 105 and 106, which comprise a type of amplifier commonly known as a grounded emitter amplifier. These transistors produce current pulsations in the primary winding of transformer 107 and corresponding high voltage pulsations across the secondary winding of transformer 107. These high voltage pulsations constitute an alternating voltage with a peak voltage of approximately 1000 volts when the parameters of the circuit are correctly chosen. The high alternating voltages are rectified by passing through semiconductor diodes 110 and 111 to cause charging of energy storage capacitor 112 to a high voltage of approximately 1000 volts. This energy storage capacitor may conveniently have a value of, for example, 2 mfd. Across energy storage capacitor 112 are connected in series the toroidal winding 113 of transmitter transducer 26 and a cold cathode thyratron 114. The values of circuit parameters, including associated resistors, is chosen such that when the voltage across energy storage condenser 112 reaches 1000 volts, to which value it is charged exponentially, the cold cathode thyratron 114 begins to conduct and discharges capacitor 112 into the toroidal winding 113 of transmitter transducer 26, resulting in the production of a sound pulse, because of the magnetostrictive properties of the core 115 of transmitter transducer 26 as explained above. The cylindrical core 115 of transmitter transducer 26, as is true for the other transducers used, may be of nickel as stated above, or it may be formed of a scroll winding of partially insulated thin-strip material of commercially available magnetostrictive material commonly used for this purpose.

Connected in shunt with condenser 112 are semiconductor diodes 116. When cold cathode thyratron 114 conducts, energy storage capacitor 112 discharges into toroidal winding 113 in such a way as to produce a series of fluctuations of current in said toroidal winding. That is to say, there are produced oscillations of current in this winding because of the inductance of the winding. It is well known to those skilled in the art that when a sudden impulse of current passes thorugh a closed circuit loop containing inductance and capacitance, that such current oscillations result and will persist for a relatively long period of time if the inductance is relatively large. This situation exists in this apparatus, since the inductance of the transmitter transducer such as described may be as high as 470 microhenries. These resulting current oscillations produce stray magnetic fields which induce interfering voltages into portions of the receiving circuits, where said interfering voltages produce incorrect operation of said receiver circuits, with the result that signals transmitted to the surface-recording and indicating apparatus will be of such a form as to produce erroneous indications. Diodes 116 are so connected that they conduct no current until the voltage polarity across capacitor 112 is reversed because of the current oscillations above described. When the voltage polarity across capacitor 112 is thus reversed, diodes 116 become conductive and discharge capacitor 112, thus preventing any further current oscillations and any corresponding interference with correct operation of other circuits of the apparatus.

Diodes 120 and 121 are used as voltage regulators to maintain at a constant value the voltage supplied to the transistors in the circuit. Since the repetition rate of the transmitter pulse generator is a function of the voltage supplied to the transistors, these voltage regulators serve to keep the repetition rate constant. The diodes 120 and 121 are operated at their Zener potential to provide satisfactory regulator operation in conjunction with the associated resistors in the circuit.

Transmitter and receiver transducers 22, 24 and 25 respectively may conveniently be of identical construction as described above. Each consists of a cylindrical core, these being diagrammatically indicated at 115, of a toroidal winding diagrammatically indicated at 113, and associated leads or terminal connections.

Each of the toroidal winding is connected to ground on one side and to an input terminal of an associated switching amplifier such as 35. These amplifiers are substantially identical with those described in my pending patent application Serial Number 745,351, filed June 30, 1958, except for two particulars. As described above, each of these amplifiers operates to amplify in substantially undistorted form the first half cycle of the alternating voltage produced by its associated receiver transducer, and then switch off after the second half cycle of the said alternating voltage reaches a certain level of polarity opposite to that of the first half cycle of said alternating voltage produced by the associated receiver transducer. This amplifier is modified first with respect to the grid of triode 120 there is connected in series a resistor 121 which attenuates very high frequency voltages coupled into the receiver circuits by means of stray magnetic fields from the transmitter transducer 26. This attenuation is produced since the resistor 121 in conjunction with the input capacity of triode 120 constitutes a voltage divider circuit for very high frequencies. The second modification is that capacitor 122 connects the input grid of the triode 120 comprising the first stage of amplifier 35 to the plate of triode 123, which comprises one section of the trigger circuit containing additional triodes 124 and 125. When the plate of triode 125 begins the production of a positive pulse of voltage when the voltage appearing on the grid of triode 120 exceeds a critical triggering level in the positive direction with respect to the ground connection 126 the capacitor 122 provides a positive feedback loop in the amplifying circuit composed of triodes 120, 130, 124 and 125. Thus, there is produced at grid of triode 120 a very rapidly rising pulse of positive voltage with respect to ground connection 126. This positive feedback loop would normally cause continuous oscillations to be produced by the said amplifying circuit, except for the fact that triode 124 is normally nonconducting until the voltage at the grid of triode 120 exceeds the abovementioned critical positive triggering level.

The operation which results from the reception of a positive half cycle of signal following upon the initial reception of a negative half cycle of signal in response to the reception of a sound pulse in the trigger circuit containing triodes 124 and 125 begins with the production of a positive voltage pulse of the plate of triode 125. This results in a rapidly rising positive pulse at the grid of triode 120 and a corresponding output pulse at the secondary winding terminals of transformer 131; this pulse and all further signals from amplifier 35 are terminated after a slight delay by the cutting off of triodes 132 and 133. The cutting off of triodes 132 and 133 is caused by bias developed across resistor 134 when cathode follower triode 123 draws increased current through resistor 134. This bias voltage develops slowly because the capacitor 135, connected in shunt with resistor 134 must first be charged. Thus, the bias voltage reaches the value required for cutoff of triodes 132 and 133 after a slight delay during which a positive spike pulse of voltage is transmitted through triodes 132 and 133 before they are cut off.

The polarity with respect to ground connection 126 of the first half cycle of receiver signal and of the corresponding opposite polarity spike pulse is determined in the case of a specific switching amplifier by the mode of making connections to the output winding of transformer 131. Thus, the circuits of switching amplifiers 33, 34 and 35 are identical except that connections of the output winding of transformer 131 are reversed in switching amplifier 35 from the order used in making these connections in switching amplifiers 33 and 34. The result is that signals from switching amplifier 35 at cable 11 are of reversed polarities from the corresponding signals from switching amplifiers 33 and 34.

Referring to FIGURE 3c, signals pass first into the photo-oscillographic recorder circuits 40. The construction and operation details of these circuits are of a conventional nature well known to those skilled in the art in general and for that reason will not be further described here, except for the construction of double-beam cathode ray oscilloscope 52, the use of which in this invention constitutes a novel application of this type of device. The double-beam cathode ray oscilloscope 52 is preferably constructed using a split-beam cathode ray tube. This type of cathode ray tube is one containing a single cathode ray gun, a first pair of associated, cooperating deflection plates for beam deflection in one direction and a second pair of noncooperating deflection plates for beam deflection in directions normal to the of deflection produced by said first pair of associated, cooperating deflection plates. Associated with the cathode ray gun there is a beam-splitting electrode operated at cathode potential, and a beam splitting magnet with such strength that it impinges upon the beam-splitting electrode and is split into two cathode ray beams, both beams being equally deflected in one direction by said first pair of asociated, cooperating deflection plates, and each beam being independently deflected in directions normal to that of deflection produced by said first pair of associated, cooperating deflection plates to indicate the form of two separate electrical signals. In the circuit of cathode ray oscilloscope 52 this split-beam oscilloscope is illustrated diagrammatically; however, auxiliary circuits, such as power supply circuits, bias voltage circuits, etc., are not shown, being of a conventional nature well known to those skilled in the art. In the practice of this invention, signals from the subsurface apparatus are transmitted from the cable 11 into input side of amplifier 50, where they are amplified without substantial distortion. The signals of amplifier 50 are transmitted into input side of cathode ray oscilloscope 52, where they are connected to a deflection plate to display the form of the signals produced by the subsurface instruments. Also supplied to the input side of cathode ray oscilloscope 52 are signals from synchronization circuits 13 to display curve plotter indicator square wave signals or timing wave calibration signals as controlled by switches within the synchronization circuits 13. Additional signals transmitted to the cathode ray oscilloscope 52 are the monotonically increasing voltage signals from sweep circuits 53 to produce deflection of the cathode ray beam in one direction at a known constant time rate in a manner well known ot those skilled in the art. Also transmitted to the cathode ray oscilloscope 52 are beam brightening signals produced by the sweep circuits 53.

The circuits of the gating pulse generator 60 are composed of bistable trigger circuits, monostable trigger circuits, of plate-loaded amplifiers, of cathode-follower amplifiers, and of paraphase amplifiers well known and will not be discussed here. However, there are so many possible circuit combinations comprising trigger circuits that it will be useful to discuss some specific circuit combination which may be used for this application. Therefore, the mode of operation of the bistable trigger circuits shown here to illustrate the present invention will be discussed in some detail. It must be pointed out that many other specific bistable trigger circuit combinations can be used for practice of this invention, provided only that they produce voltages and signals in a manner substantially equivalent to that described with reference to the trigger circuits here discussed. Further, the circuits discussed are shown for illustrative purposes, since other more complicated circuits, with substantially equivalent operating characteristics, may be used with some economy of power supplies, etc.; these specific circuits shown are chosen for illustration because they are easily explained in the text.

Consider now triodes 141 and 142, which are connected into a subcircuit comprising a bistable trigger circuit, where their cathodes are connected to ground, each plate is connected through a pair of series resistors to a source of positive voltage with respect to ground; each grid is connected through a resistor to a source of voltage negative with respect to ground. In each triode of the pair comprising the trigger, the grid is connected through a resistor shunted by a capacitor to the plate of the other triode. Thus, the pair of triodes constitutes an Eccles-Jordan trigger circuit or bistable multivibrator. Thus, there is provided a closed positive feedback path including the two triodes as plate-loaded amplifiers. Now capacitor 143 is connected at the terminal between the resistors in series between the plate of triode 141 and the positive source of voltage. Because of the time required to charge this capacitor 143 when the voltage sources powering the circuits are turned on, the voltage at the plate of triode 141 is initially equal to that of ground terminal. On the other hand, under the initial conditions in effect when the voltage sources are first turned on, the plate of triode 142 is initially established at a voltage positive with respect to ground, determined by the values of the resistors in the circuit and by the values of voltage produced by the voltage sources powering the circuits and by the values of the capacitors in the circuits and by the characteristics of the triodes used. Thus, when the voltage sources are first turned on, including the voltage source supplying the filament circuits, not shown since conventional, the triode 141 conducts because its grid is connected to a plate positive with respect to ground, whereas the triode 142 does not conduct since its grid is connected to a voltage negative with respect to ground, because of the effect of the negative voltage source, which under these conditions is not counteracted sufficiently by the voltage on the plate of triode 141 since triode 141 has its plate voltage held to a reduced value by capacitor 143 as explained above.

To recapitulate, when the gating pulse generator circuits 60 are turned on, then the bistable trigger comprising triodes 141 and 142 is in its initial condition; that is to say, triode 141 conducts and triode 142 does not conduct. Now, if a rapidly rising, short-duration negative voltage pulse is applied to the grid of triode 141, then the conditions of both these two triodes are changed so that triode 141 becomes nonconducting and triode 142 becomes conducting. This situation then persists until either of the following occurs: Positive voltage source is removed from plate circuits of triodes 141 and 142 of gating pulse generator circuits 60 or a rapidly rising short-duration rapidly rising negative pulse is applied to the grid of triode 142.

Another type of trigger circuit used in practice of this invention is the cathode-coupled monostable multivibrator such as is illustrated by the subcircuit combination comprising vacuum-tube triodes 144 and 145. This type of circuit is well known to those skilled in the art, and operates so that in its initial condition when first powered vacuum tube 145 conducts and triode 144 does not conduct. If a rapidly rising short-duration positive pulse is applied to the grid of triode 144, then the triode 144 begins conducting and triode 145 ceases to conduct. This is the unstable condition of the trigger circuit and persists for a relatively short but definite period of time, determined by the magnitude of the power voltage sources and by the values of resistors and capacitors used in the trigger circuit and by the characteristics of the triodes 144 and 145 and proportional to the product of the value of the capacitance of capacitor 146 multiplied by the value of the resistance of resistor 147. When triode 144 ceases conducting, there is produced concurrently a positive pulse of voltages at the plate of triode 144 which persists for the unstable period of the trigger. Also concurrently there is produced a negative-going pulse of voltage at the plate of triode 145 which persists for the duration of the unstable period of the trigger. Thus the triodes 144 and 145 constitute either a delay pulse generator or a latching circuit depending on where the output signal is taken from. If the plate of triode 144 is connected to a differentiating circuit comprising a resistor such as resistor 150 and capacitor 151 then there is produced a rapidly rising, short-duration positive pulse at the ungrounded terminal of the resistor which follows the initial rapidly rising, short-duration positive pulse by a delay equal in time to the period of the unstable condition of the trigger. In a similar way, voltage appearing at the plate of triode 145 may be differentiated, and the resulting initial rapidly rising, short-duration positive pulse produced at the same time as the rapidly rising, short-duration positive input pulse will constitute a latching pulse.

Figure 7:
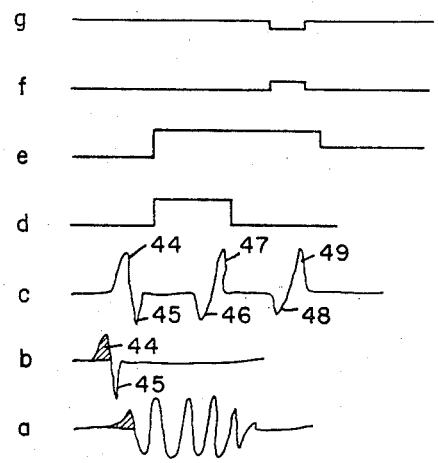
FIGURE 7 illustrates various signals appearing in various portions of the equipment.

With reference to gating switch pulse generator 60, when the negatives spike pulse of the subsurface signals, such as illustrated in FIGURE 7, arrives at the cathode of diode 152, it passes on to the grid of triode 141, where it triggers the bistable latch circuit comprising triodes 141 and 142. This results in production of a negative latching pulse at the grid of triode of cathode follower 153 and at the grid of triode 154. Triodes 154 and 155 constitute a switch pulse trigger which is triggered by this last-mentioned latching pulse. When the bistable latch trigger comprising triodes 141 and 142 is triggered, there results a negative-going latch pulse at the grid of triode 156. Triode 156 is a plate-loaded amplifier and produces at its plate a positive-going latch pulse which is applied to the grid of triode 144 and triggers a delay trigger comprising triodes 144 and 145. At the grid of triode 162 there is produced a positive-going delayed pulse, and at the plate of triode 162 there is produced a negative-going delayed pulse which is applied to the grid of triode 164 and triggers the latch trigger comprising triodes 164 and 165.

When the positive-going spike pulse produced by switching amplifier 34 begins arriving at the anode of diode 165, it passes therethrough to the grid of triode 163 and results in the production of a negative-going pulse at the plate of triode 163 which is appplied to the grid of triode 165 to de-trigger the latch trigger comprising triodes 164 and 165. This causes the production of a negative-going pulse at the plate of triode 164, which is applied to the grid of cathode follower triode 166 for application to the grid of triode 155 to de-trigger the switch pulse trigger comprising triodes 154 and 155. Thus, the switch pulse trigger comprising triodes 154 and 155 generates in the plate circuit of triode 155 a negative-going pulse with a time duration equal to the period of time intervening between reception of spike pulses produced by switching amplifiers 35 and 34 respectively.

This switch pulse is applied to the grid of paraphase amplifier triode 170 and therethrough to the grid of cathode follower amplifier triode 171. From the plate of triode 170 a positive-going switch pulse is transmitted to the double-beam cathode ray oscilloscope 52. From the cathode of paraphase amplifier triode 170 there is transmitted a negative-going pulse to the gate circuits 61. The positive-going pulse produced at the plate of triode 170 is applied to the grid of cathode follower triode 171, where it results in a positive-going pulse at the cathode of 171. This pulse is differentiated and transmitted to the converter reset pulse generator 75.

The purpose of the delay trigger comprising triodes 144 and 145 is to assure that bistable latch trigger comprising triodes 164 and 165 is not de-triggered by a later portion of the spike pulse causing initial triggering of switch pulse trigger comprising triodes 154 and 155 under the conditions prevailing when poor well logging cables are used, which conditions often cause the signals to ring or oscillate for a short period of time after their generation has ceased within the subsurface apparatus. Furthermore, the use of a delay circuit reduces the probability of erroneous measurements caused by subsurface and other noise. The purpose of the latch triggers comprising triodes 141 and 142 and comprising triodes 164 and 165 is to insure that only one gating switch pulse is produced after the production of a sound pulse in the subsurface apparatus before the termination of a cycle of the recording process and before the counters and other circuits are reset into their initial conditions by pulses from the counter and gate reset pulse generator and from the converter reset pulse generator.

The gate circuits 61 may conveniently consist of two triodes 180 and 181. Triode 181 constitutes a plate-loaded triode with cathode bias resistor while triode 180 constitutes a bias developing triode. Since its grid is returned through a resistor to a large positive potential with respect to ground, it draws a relatively large current through the cathode bias resistor of triode 181, thereby cutting off current through triode 181. In its initial condition in the absence of any signals produced by the subsurface apparatus, no signals are therefore produced at the plate of triode 181, although constant frequency pulses are fed into the grid of triode 181 from constant frequency pulse generator 63. However, when the gating switch pulse generator 60 produces a switch pulse in response to the reception of acoustic signals by the subsurface receivers, then the grid of triode 180 is made negative by the negative-going pulse transmitted to it, and current through triode 180 ceases; and the large bias developed initially across the cathode bias resistor of triode 181 is reduced so that triode 181 begins to conduct and produces at its plate constant frequency negative pulses which are transmitted to the digital counter 64 for a period of time equal in number to the time in microseconds required for a sound pulse to travel from the near receiver to the middle receiver in the subsurface apparatus.

With reference to the digital counter circuits 64, these comprise a number, for example 10, of identical bistable triggers with associated plate-loaded amplifiers as is well known in the art. The plate-loaded amplifiers are used for buffers to prevent undesired interactions between successive trigger subcircuits, and are biased to cut off so as to produce only negative pulses at their plates. The ten bistable triggers and associated amplifiers are shown diagrammatically at 190 through 199.

The counter converter circuits 70 comprise in part an iterative series of similar subcircuits so constructed as to produce across output terminals an electrical quantity which is proportional to the travel time or to the velocity of the formation corresponding to each unique combination of triggered and de-triggered bistable-scale-of-two counter triggers in the counter circuits. Many subcircuit combinations may be used to produce this proportional electrical quantity in practice of this invention. The subcircuits shown as serving this function in FIGURE 3 and as constituting in part the converter circuits are chosen to illustrate the invention because of their relative simplicity. As shown, they produce a resistance ratio very nearly proportional to the travel time and a voltage nearly proportional to the travel time.

Only the converter circuit associated with bistable trigger 190 of the digital counter 64 will be shown and described in detail since the remaining converter circuits associated with the bistable triggers 191 and 199 are identical except for different value resistors. The counter converter circuits 70 comprise a resistor, such as resistor 201 proportional to the time interval increment corresponding to the de-triggered condition of the corresponding bistable-scale-of-two trigger subcircuit 190. The resistor 202 is chosen to be much larger than the sum of the resistors of all the individual converter circuits such as 201. For example, resistor 201 may equal 2 ohms, corresponding to a time interval increment of 2 microseconds; and in general the resistor corresponding to the $n$th bistable-scale-of-two trigger subcircuit in digital counter 64 may be equal in ohms to $2^n$ and resistor 202 may be made equal to 100,000 ohms.

Counter converter circuits 70 comprise also a series of identical triode switch subcircuits. In each of these triode subcircuits the grid, as for example the grid of triode 203, is connected to a voltage generating point in the corresponding bistable-scale-of-two counter trigger subcircuit 190 of digital counter 64. In the plate circuit of each triode subcircuit there is connected a relay, as for example, in the plate subcircuit of triode 203 there is connected a relay 204. The relay 204 controls the connections of the network including battery 205, resistors 202 and 201. The current in the relay in turn is controlled by the condition of the corresponding bistable-scale-of-two counter trigger acting through the triode 23 and the position of the movable control of relay 206 of the converter reset pulse generator 75 so that when a given bistable-scale-of-two counter trigger is in the triggered condition, coincident with relay 206 being energized, the terminals of the corresponding resistor functionally identical to resistor 201 are shorted; and so that when the said given bistable-scale-of-two counter trigger is in the de-triggered condition, coincident with relay 206 being energized, the terminals of the said corresponding resistor functionally identical to resistor 201 are unshorted. Thus, the sum of the values of the resistors functionally identical to resistor 201 is equal in ohms to the time interval required for sound to travel from the near to the middle receiver, provided that relay 206 is energized. Since resistor 202 is very large and since the resistance of resistor 202 and the voltage of battery 205 are of constant values, then the voltage appearing across terminals 210 and 211 is very nearly proportional to the time required for sound to travel from the near to the middle receiver. Likewise, the ratio of resistance across terminals 210 and 211 to the resistance across terminals 212 and 211 is very nearly proportional to the time required for sound to travel from the near to the middle receiver in the subsurface apparatus. The remainder of the bistable trigger circuits of digital counter 64 are coupled to circuits similar to that described above but having different value resistors, these circuits are shown diagrammatically at 214 to 222.

Let us now trace the sequence of operations occurring in counter converter 79 when signals are produced by the subsurface apparatus. As described above, when the subsurface apparatus has terminated the transmission of a series of signals resulting from production of a sound pulse by the transmitter circuits, then the digital counter circuits 64 are no longer in the initial condition. Rather, there is a unique combination of triggered and de-triggered bistable-scale-of-two counter triggers corresponding to the specific time required for sound to travel from the near to the middle receivers in the subsurface apparatus. In each de-triggered bistable-scale-of-two counter trigger the plate of one triode of the pair is raised to a certain potential positive with respect to ground. Now the batteries functionally identical to battery 223 have a voltage to cut off current in triodes functionally identical to triode 203 when the corresponding bistable-scale-of-two counter trigger is in the triggered condition. The voltage of battery 223 is, however, small enough so that when the corresponding bistable-scale-of-two counter trigger is in the initial or the de-triggered condition, the triodes functionally identical to triode 203 are capable of conducting current. However, in the initial condition the triodes functionally identical to triode 203 do not conduct current, because in the initial condition before the reception of signals from the subsurface apparatus the cathodes of these triodes are disconnected from ground, since in the initial condition the relay 206 of converter reset pulse generator 75 is not energized by current passing therethrough. Furthermore, current through relay 206 is provided only for specific short intervals of time during the recording process after the beginning of logging operations, so that only during these specific short intervals of time can the triodes functionally identical to 203 conduct current, and then only if coincidently the corresponding bistable-scale-of-two counter trigger is in the de-triggered condition. Thus, when relay 206 is energized, each relay functionally identical with relay 204 becomes energized if the corresponding bistable-scale-of-two counter trigger is in the de-triggered condition.

Now in the recording cycle, after the termination of the gating switch pulse and after the corresponding cessation of counting operations in the digital counter, the relay 206 is energized for a short period of time by the converter reset pulse generator circuits in a manner to be discussed below. When relay 206 is thus energized, the cathodes of each triode in the converter circuits are thereby connected for a short period of time to ground potential and as a result current flows through the triode and its associated corresponding relay if the corresponding bistable-scale-of-two counter trigger is in the de-triggered condition. Thus, certain relays of the converter circuits are energized by the passage of current therethrough. Now each relay in the converter circuit is connected as is the relay 204, so that when once energized current flows through the relay not only by passing through the corresponding triode, but also by passing through a resistor functionally identical to resistor 224 and through a pair of contacts of the relay which make contact when the relay is energized by the passage of current therethrough. Thus, all the relays energized as a result of energizing relay 206 remain energized after relay 206 ceases to be energized. Thus, after relay 206 has been energized for a short period of time during the recording cycle, there is a unique combination of energized relays in the converter circuits corresponding to time required for sound to travel from the near to the middle receiver in the subsurface apparatus.

Now, each energized relay in the converter un-shorts the terminals of its corresponding associated resistor functionally identical to resistor 201. Thus there is produced a specific value of resistance across terminals 210 and 211 such that the voltage across these terminals is very nearly proportional to the time required for a sound pulse to travel from the near to the middle receiver in the subsurface apparatus and such that the ratio of the resistance across terminals 210 and 211 to the resistance across terminals 212 and 211 is very nearly proportional to the time required for sound to travel from the near to the middle receiver in the subsurface apparatus.

With respect to proportional indicator 73, this device is merely a voltmeter with high impedance and with a scale appropriate to indicate the full range of travel time values likely to be encountered. With the values of resistance suggested for the counter and with the voltage of battery 205 being 100 volts, this voltmeter may conveniently cover the range from 40 to 1000 millivolts.

With respect to proportional recorder 74, this may conveniently be of the type known as a slide wire pen recorder. In this recorder, slide wire resistor element 230 may conveniently have a value of 1000 ohms and resistor 231 may conveniently have a value of 100,000 ohms. The proportional recorder 74 contains, in addition, a two-phase servo motor 232, a servo amplifier 233, these being interconnected as shown by the schematic diagram. The servo motor is mechanically coupled to the sliding contact of variable resistor element 230, so that rotation of the motor produces motion of the sliding contact along the resistor element. Now the servo amplifier 233 has its input connected between the sliding contact of variable resistor element 230 and the terminal 210 respectively, so that the magnitude and sign of the input voltage to the amplifier 233 is equal to the difference between the voltage with respect to ground appearing at terminal 210 and that appearing at the sliding contact on resistor element 230. Now the servo amplifier 233 has a chopper in its input circuit to convert the input DC voltage to pulsating DC. This chopper operates at the frequency of the power line connected to the armature of the servo motor 232. This connection between the servo motor and the power line is through the amplifier 233, and the connection between the amplifier 233 and the power line is not shown. Now the direction of rotation of the servo motor 232 is determined by the polarity of the DC input voltage, and the circuits of the servo amplifier 233 and of the servo motor 232 are so connected that the motor always rotates in such a direction as to reduce the input voltage to zero. Since the motor is mechanically coupled to the sliding contact of variable resistor element 230, the sliding contact is thus always moved to such a position that the voltage between ground and the sliding contact is equal to the voltage between terminal 210 and ground. Under these conditions, the resistance appearing between ground and the sliding contact of resistor element 230 is very nearly equal to the resistance appearing between ground and the terminal 210, which as explained above is equal in ohms to the number of microseconds required for sound to travel from the near to the middle receiver. Now a recording pen may be attached mechanically in a movable way to the sliding contact of variable resistor element 230 and thus trace a line on a piece of chart paper, with the chart paper being moved in a direction perpendicular to the direction of motion of the pen to produce a constant depth scale along one direction on the chart and to produce a line, the deflection of which from a reference line will be proportional to the travel time of a sound pulse from the near to the middle receiver, provided that resistance per unit length of the slide wire is constant. If the slide wire is so constructed that the resistance between the grounded fixed terminal and any point on the slide wire is proportional to $1/L$, where $L$ is the distance from the ungrounded fixed terminal to the point, then the deflection of the sliding contact from the ungrounded fixed terminal will be proportional to velocity. Thus velocity may be recorded on a linear chart scale if suitable scale and reference lines are provided on the chart. Motion of the chart in the direction representing depth is produced, as explained above, by mechanical coupling between the chart paper drive of proportional recorder 74 and a selsyn connected electrically to sheave selsyn 12 not shown.

With reference to digital indicator 71, this circuit, as explained above, contains indicating lamps, for example, neon indicator lamps, for indicating in a digital manner the time required for sound to travel from the near to the middle receiver in the subsurface apparatus. Each indicator lamp, as for example indicator lamp 234, is connected to the counter circuits to supply the lamp circuits a voltage for lighting the lamp, provided that the corresponding bistable-scale-of-two counter trigger is in the de-triggered condition. Thus, there is produced in digital indicator circuits 71 for observation at the instant of energizing relay 206 a specific unique combination of lighted and unlighted lamps to indicate in a digital manner the time required for sound to travel from the near to the middle receiver in the subsurface apparatus.

With reference to the digital recorder circuit 72, this circuit contains electromagnetically operated hole punch devices, indicated diagrammatically at 235, to produce punched holes in a contained paper chart, or in a chart of other material, said chart being driven in depth synchronism with the vertical motion of the subsurface apparatus by means of a selsyn, not shown, coupled electrically with the sheave selsyn 12 and coupled mechanically with the chart paper drive of the digital recorder 72, to produce a chart as illustrated by FIGURE 5. The digital recorder circuit contains electromagnetically operated relays as relay 236, triodes as 237, electromagnetically operated hole punch devices as 235, resistors, and batteries. When a given bistable-scale-of-two counter trigger is in the de-triggered condition and when relay 206 is energized, there is transmitted to digital recorder circuits from converter circuit 70 a positive potential which causes the corresponding triode 237 to conduct current. The triode 237 is normally cut off, but when it conducts it energizes the relay 236 to cause current to pass through the winding of hole punching device 235, thus energizing the same and causing it to punch a hole. Thus, there is produced on the digital recorder a chart a row of punched holes, with a specific unique combination of positions corresponding to the time required for a sound pulse to travel from the near to the far receiver. The remaining digital recording punches are shown schematically at 261–269.

The converter reset pulse generator circuit 75 contains a relay, battery, resistors and condensers and triodes connected in monostable trigger circuits, and a triode connected in a power switch circuit. Triodes 240 and 241 constitute a latch trigger; triodes 242 and 243 constitute a delay trigger; triodes 244 and 245 constitute a switch pulse trigger.

When the gating switch pulse generator 60 terminates a gating switch pulse, there is produced a positive voltage pulse which is transmitted to the grid of triode 240 in converter reset pulse generator 71. The monostable latch trigger comprising triodes 240 and 241 is then triggered, producing at the grid of triode 242 a positive pulse, which triggers the monostable delay trigger comprising triodes 242 and 243. The period of this said delay trigger comprising triodes 242 and 243 is made equal to about 0.01 sec., by proper choice of the subcircuit parameters. Thus, about 0.01 sec. after it is triggered, the monostable trigger comprising triodes 242 and 243 produces a positive pulse at the grid of triode 244, which pulse triggers the monostable switch pulse trigger comprising triodes 244 and 245, resulting in the production of a positive switch pulse with a period of about 0.01 sec. which is applied to the grid of triode 246, which constitutes a power switch for operation of relay 206. Thus, triode 246, normally cut off, is made conductive and conducts current which energizes relay 206 ofr a period of time equal to about 0.01 sec. The energizing of relay 206 produces effects discussed above with reference to other circuits illustrated in FIGURE 3. Approximately 0.01 sec. after the monostable trigger comprising triodes 244 and 245 is triggered, the same monostable trigger de-triggers and simultaneously produces at the plate of triode 244 a positive-going voltage. As a result, there is produced a positive pulse of voltage which is transmitted to the counter and gate reset pulse generator 62.

The counter and gate reset pulse generator 62 contains a relay, a triode connected in a power switch subcircuit, triodes connected in monostable trigger subcircuits, a battery, resistor, condensers. When a positive pulse is transmitted from the converter reset pulse generator circuit 75, it causes the monostable trigger comprising triodes 250 and 251 to trigger. The monostable trigger comprising triodes 250 and 251 constitutes a delay trigger, and after a period of approximately 0.01 sec. there is produced at the grid of triode 252 a positive pulse which triggers the monostable switch pulse trigger comprising triodes 252 and 253, resulting in the production of a positive switch pulse at the grid of triode 254. Triode 254 constitutes a power switch and is normally cut off. The said positive switch pulse produced at the grid of triode 254 causes it to conduct and thus to energize relay 255. The energizing of relay 255 results in the opening of its single pair of contacts, thus removing positive plate voltage from the triodes in the gating switch pulse generator 60 and the counter circuit 64. Thus, when relay 255 is energized, the plate voltage is removed from the counter circuits 64 and from the gating switch pulse generator 60, causing them to be returned to the intial conditions existing when the surface and subsurface apparatus was first energized and before any signals had been produced by the subsurface apparatus. This resetting of the circuits 64 and 60 to their initial condition is the last operation of the recording cycle and places the recorder apparatus in a condition ready to manipulate a succeeding series of signals from the subsurface apparatus.

With respect to constant frequency pulse generator 63, this circuit is of a conventional nature. It contains triodes, condensers, resistors, diodes, a battery, and a quartz frequency-determining crystal 260. The resonant frequency of the crystal may conveniently be 1 megacycle for use in practice of this invention. The operation of circuits such as this is well known to those skilled in the art and will not be explained here. The output pulses from this circuit consist of a continuous series of constant frequency positive pulses.

Although no DC power supply is shown it may consist of batteries or combination of transformers, rectifiers, and filters for powering the various circuits constituting the logging apparatus used in practice of this invention.

It will be clear that circuits somewhat different from those described here may be used in practice of this invention without departing from the spirit thereof. For example, transistors may be used in suitably designed trigger subcircuits to replace the vacuum-tube trigger subcircuits here described. Also different types of trigger subcircuits may be used to produce results equivalent to those here described.

In particular, there are various novel combinations of interconnections for the elements of proportional recorder 74 including variable resistor 230, the resistor 231, also the resistors 201, and 202, the battery 205, and the servo amplifier 233, for producing various types of presentation of data on the record of proportional recorder 74, or on records of other types of recorder, or on indicators. Furthermore, the values of resistance assigned to these resistors may be varied so as to produce the type of presentation of data desired on the record.

If resistor 202 is made very small compared with the sum of resistors 201 and others similar thereto and if resistors 231 and 230 are suitably proportional, then the deflection of the slide wire movable contact of the recorder 74 in FIGURE 3 will be proportional to velocity, and suitable reference and scale lines may be used to indicate the velocity of earth formations on a linear scale.

Figure 6A:
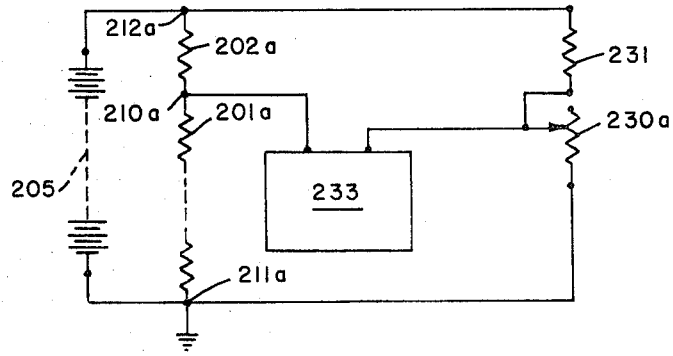
FIGURES 6a, 6b and 6c illustrate various combinations of connections which may be used in the proportional recorder in practice of this invention.
Figure 6B:
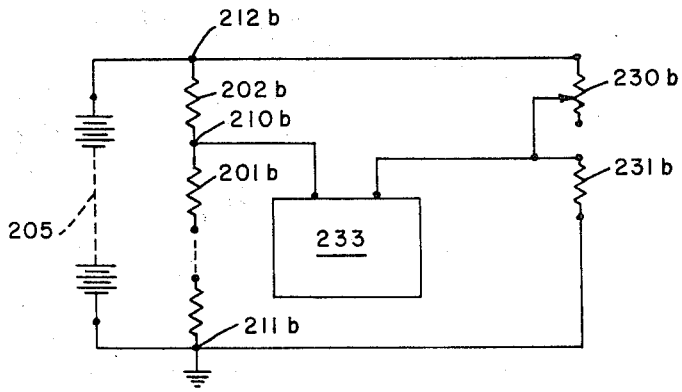

FIGURE 6 illustrates various modification of the converter circuit 70 of FIGURE 3 which permits one to generate either a voltage, current or resistance proportional to the velocity or travel time as desired. Items in FIGURE 6 which perform the same function as similar items in FIGURE 3 bear the same number with an appropriate subscript. FIGURE 6a illustrates a novel combination of connections of elements for making the value of resistance between slider on the resistance 230a and terminal 211a exactly proportional to the travel time rather than approximately proportional as in the combination illustrated in a corresponding manner in FIGURE 3. Thus the corresponding deflections on the chart plotted curve will be exactly proportional to travel time. The resistance per unit length of scale wire resistance element 230a is here constant. Resistor 231a may conveniently be made equal to resistor 202a.

FIGURE 9b illustrates a combination of connections of elements for making the value of resistance between slider of the resistance 230b and terminal 212b exactly proportional to the velocity of the formation. Resistor 202b must be larger than the maximum value of resistance appearing between terminals 210b and the maximum value of resistance of slide wire resistor element 230b must be larger than the resistance of resistor 233b. Under these conditions, if the value of resistance appearing between terminals 210b and 211b is made equal to the travel time in microseconds, then the velocity is given by the following expression:

$$V = \frac{r'}{RR'} \times 10^6$$

where $r'$ is the value of resistance appearing between slider of resistance 230b and terminal 212b; R is the value of resistance of resistor 202b; R' is the value of resistor 231b. Resistors 202b and 231b may conveniently be made equal to each other and 1000 ohms; the maximum value of resistance appearing between the slider and terminal 212b may conveniently be made equal to 25,000 ohms; thus a useful range of velocities will be indicated by the slide wire recorder 74 of FIGURE 3. Suitable scale reference lines may be provided on the chart of the proportional recorder to thus indicate the velocity of the rock on a linear velocity scale.

Figure 6C:
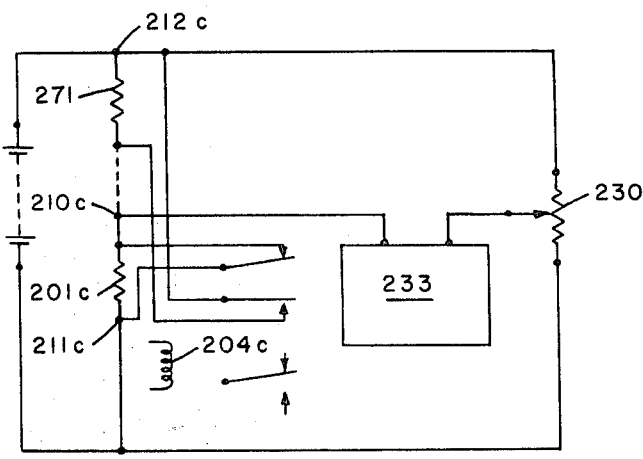

FIGURE 6c illustrates a combination of connections for making the ratio of resistance between terminals 210c and 211c to the resistance across terminals 212c and 211c exactly proportional to the travel time. In this modification the relay 204c functionally identical with relay 204 of FIGURE 3b has a third movable contact in addition to those shown in FIGURE 3 to control an additional resistor 271. Resistor 201c may conveniently be made equal to corresponding resistor 271. With this combination the value of resistance between slider of resistance 230 and terminal 211c will be exactly proportional to the travel time, and thus suitable scale and reference lines may be used on the recorder chart to indicate the travel time on an exact rather than on an approximately linear time scale.

It will be clear to those skilled in the art that other combinations can be used without departing from the spirit of the invention. For example, for the resistance elements there may be substituted conductance elements without substantial change in the operation of the above combinations. Also other connections may be used to provide current or voltages proportional to travel time or velocity or a combination of both. Likewise resistances may be utilized to give both velocity and travel time information if desired.

I claim as my invention:

1. A well logging system comprising: a subsurface apparatus adapted to be lowered into a borehole, means coupled to said subsurface apparatus for supporting said subsurface apparatus in said borehole, said subsurface apparatus including an acoustic wave source and two receivers spaced along a vertical line, said receivers in addition being mounted on one side of said wave source, an electrical circuit means coupled to said subsurface apparatus for connecting said subsurface apparatus to the surface, means in said subsurface apparatus for energizing said wave source to produce an acoustic impulse reaching said two receivers in succession; each receiver translating said impulse into an electrical signal to be transmitted by said circuit means to the surface, additional circuit means actuated by the receiving of said impulse at the receiver nearest said wave source to decouple said nearest receiver from said electrical circuit means.

2. A well logging system comprising: a subsurface apparatus adapted to be lowered into a borehole, means coupled to said subsurface apparatus for supporting said subsurface apparatus in said borehole, said subsurface apparatus including an acoustic wave source and two receiver spaced along a vertical line, said receivers in addition being mounted on one side of said wave source; a first electrical circuit means coupled to said subsurface apparatus for connecting said subsurface apparatus to the surface; means in said subsurface apparatus for energizing said wave source to produce an acoustic impulse reaching said two receivers in succession, each receiver translating said impulse into an electrical signal to be transmitted by said first electrical circuit means to the surface, a second circuit means coupled to the receiver nearest the wave source, said circuit means being actuated by the receiving of said impulse at the receiver nearest said wave source to decouple said nearest receiver from said first circuit means, surface recording means including oscilloscope means coupled to said first electrical circuit means for indicating the shape and time spacing of said electrical signals and digital recording means coupled to said first electrical circuit means for measuring the time spacing between said electrical signals.

3. A well logging system comprising: a subsurface apparatus adapted to be lowered into a borehole, means coupled to said subsurface apparatus for supporting said subsurface apparatus in said borehole, said subsurface apparatus including an acoustic wave source and two receivers spaced along a vertical line, said receivers in addition being mounted on the side of said wave source, an electrical circuit means coupled to said subsurface apparatus for connecting said subsurface apparatus to the surface, means in said subsurface apparatus for energizing said wave source to produce an acoustic impulse reaching said two receivers in succession, each receiver translating said impulse into an electrical signal to be transmitted by said circuit means to the surface; each receiver being coupled to a separate amplifying circuit to amplify the first half wave of said electrical signals, at least the amplifying circuit coupled to the receiver nearest to said wave source including a trigger means responsive to the second half wave of said electrical signal to bias said amplifier to a cut-off position when said second half wave reaches a threshold voltage level and a second circuit means coupled to each amplifier to add a switch tail to said electrical signals after the second half wave reaches said threshold voltage level.

4. A well logging system comprising: a subsurface apparatus adapted to be lowered into a borehole, means coupled to said subsurface apparatus for supporting said subsurface apparatus in said borehole, said subsurface apparatus including an acoustic wave source and two receivers spaced along a vertical line, said receivers in addition being mounted on one side of said wave source; an electrical circuit means coupled to said subsurface apparatus for connecting said subsurface apparatus to the surface; means in said subsurface apparatus for energizing said wave source to produce an acoustic impulse reaching said two receivers in succession, each receiver translating said impulse into an electrical signal, each receiver being coupled to an additional circuit means, said additional circuit means being coupled to said electrical circuit means, said additional circuit means being disposed to transmit the first half cycle of the electrical signal of each receiver and add an additional pulse of short duration and large amplitude to said first half cycle signal; a surface recording means disposed to receive the electrical signals transmitted from said subsurface apparatus; said surface recording means including a gate circuit disposed to utilize said electrical signals to generate a gate pulse having a width proportional to the time separation between said electrical signals; a source of constant frequency pulses and a digital counter disposed in said surface recording means; said source of constant frequency pulses being coupled to said digital counter through said gate circuit whereby said gate circuit can control the application of pulses from said source to said digital counter.

5. A well logging system comprising:
a subsurface apparatus adapted to be lowered into a borehole, said subsurface apparatus including at least one acoustic wave source and at least two receivers of acoustic waves, said receivers being spaced along the axis of the borehole and located to one side of the wave source;
cable means coupled to said subsurface apparatus for supporting said subsurface apparatus in the borehole, said cable means in addition containing electrical circuits for supplying power to the subsurface apparatus and transmitting signals from the subsurface apparatus;
said subsurface apparatus including means to energize the acoustic wave source to generate an acoustic wave reaching said receivers in succession, each receiver receiving said acoustic wave and translating it into a related electrical signal;
a first circuit means located in the subsurface apparatus and including a switch circuit, the receiver nearest to the acoustic wave source being coupled to the switch circuit, said switch circuit being responsive to said near receiver to transmit at least the first half cycle of said receiver signal while altering the remainder, said switch circuit adding a large amplitude short duration pulse immediately after the said at least first half cycle of the recevier signal;
a second circuit means, the other of said receivers being coupled to said second circuit means, said second circuit means being responsive to the other receiver signal to add a large amplitude short duration pulse to said other receiver signal;

said first and second circuit means being coupled to said cable means to transmit the output signals of said first and second circuit means to the surface.

References Cited

UNITED STATES PATENTS

| | | | |
|---|---|---|---|
| 2,207,281 | 7/1940 | Athy et al. | 181—0.5 |
| 2,410,066 | 10/1946 | Harrison | 340—3 |
| 2,566,078 | 8/1951 | Bliss | 346—33 |
| 2,704,364 | 3/1955 | Summers | 181—0.5 |
| 2,708,485 | 5/1955 | Vogel | 181—0.5 |
| 2,719,280 | 9/1955 | Rolfe | 340—3 |
| 2,907,021 | 9/1959 | Woods | 235—154 |
| 2,931,455 | 4/1960 | Loofbourrow | 181—0.5 |
| 2,938,592 | 5/1960 | Charske et al. | |
| 2,949,973 | 8/1960 | Broding et al. | 181—0.5 |
| 3,018,839 | 1/1962 | Isaacson | 181—0.53 |

FOREIGN PATENTS 619,964 5/1961 Canada.

SAMUEL FEINBERG, *Primary Examiner.*

JAMES FOX, *Assistant Examiner.*

U.S. Cl. X.R.

340—18